United States Patent
Doell et al.

(10) Patent No.: US 6,216,832 B1
(45) Date of Patent: Apr. 17, 2001

(54) INTEGRAL BLOCK FOR NON-DRIVEN NON-STEERABLE WHEELS OF AN AUTOMOTIVE VEHICLE

(75) Inventors: Andreas Doell, Frankfurt; Michael Schorn, Bad Camberg; Michael Kautenburger, Bad Homburg; Marc-Oliver Rettig, Frankfurt, all of (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 09/167,340

(22) Filed: Oct. 7, 1998

(30) Foreign Application Priority Data

Oct. 10, 1997 (DE) .................................. 197 44 946

(51) Int. Cl.[7] .................................................. F16D 65/04
(52) U.S. Cl. ............................................. 188/341; 301/6.1
(58) Field of Search .................................... 188/340, 325, 188/327, 341, 106 A; 301/6.1, 6.8, 105.1

(56) References Cited

U.S. PATENT DOCUMENTS 2,144,025 * 1/1939 Brie ................................... 188/106 A

FOREIGN PATENT DOCUMENTS

| 2903051 | 8/1979 | (DE) . |
| 3714275 | 11/1988 | (DE) . |
| 4203173 | 8/1992 | (DE) . |
| 4122420 | 1/1993 | (DE) . |
| 19533430 | 3/1997 | (DE) . |
| 19622520 | 11/1997 | (DE) . |
| 0550822 | 7/1993 | (EP) . |

* cited by examiner

*Primary Examiner*—Matthew C. Graham
(74) *Attorney, Agent, or Firm*—Rader, Fishman & Grauer PLLC

(57) ABSTRACT

An integral block for non-driven and non-steerable wheels of an automotive vehicle includes a brake drum, a wheel hub, an antifriction bearing, an axle journal, and an assembly base for non-rotating components of a drum brake. The latter include brake shoes and appertaining mounting means, as well as brake cylinders, brake pistons and parts for connection to brake shoes. An assembly base made by die-casing or forging is formed as a carrier plate having an integrally molded stop for supporting the brake shoes in a circumferential direction, and either a separate, thin-walled mud plate is provided or an integrated mud ring. As opposed to conventional component groups, in which the mounting base is a plate section, the integral block of the invention can more reliably take into account varying load requirements, thereby achieving substantial reductions in weight and manufacturing costs.

9 Claims, 3 Drawing Sheets

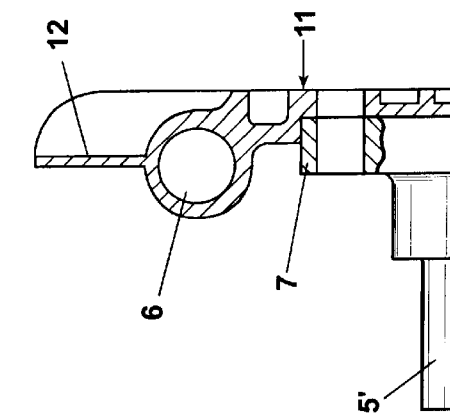
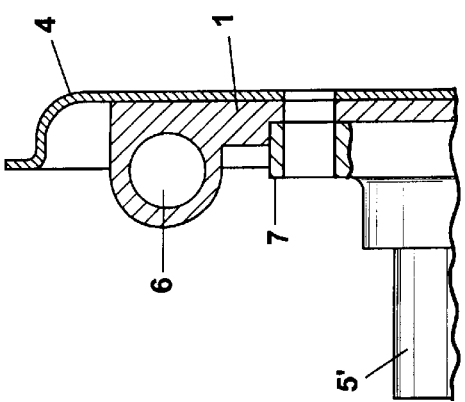
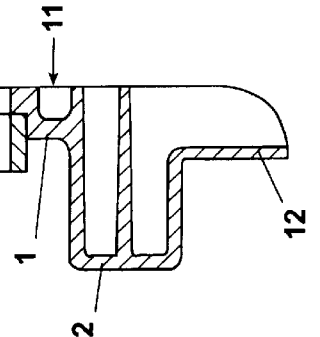
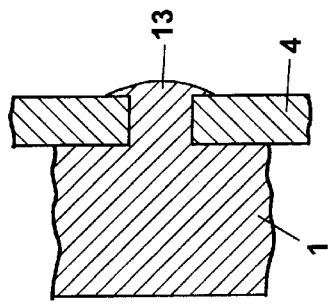
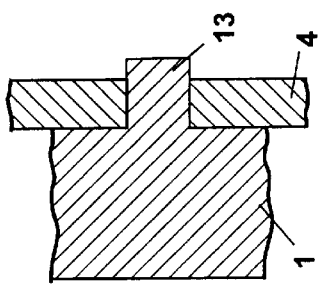
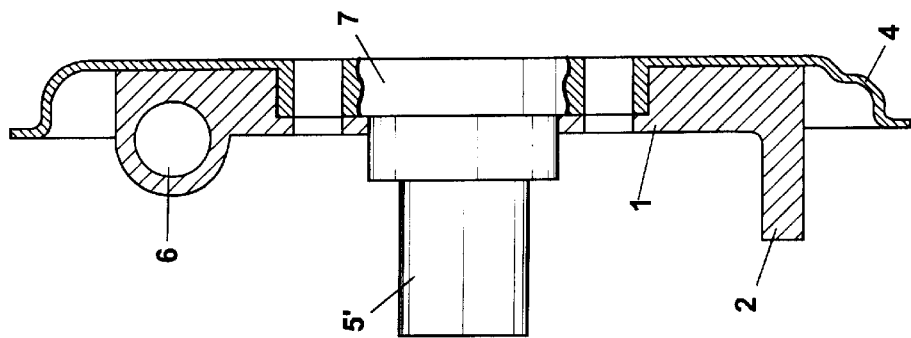

INTEGRAL BLOCK FOR NON-DRIVEN NON-STEERABLE WHEELS OF AN AUTOMOTIVE VEHICLE

BACKGROUND OF THE INVENTION

The present invention relates to a component group for non-driven and non-steerable wheels of an automotive vehicle or the like, comprising a brake drum, a wheel hub, an anti-friction bearing, an axle journal and an assembly base for the non-rotating components of a drum brake, including brake shoes and associated mounting means as well as brake cylinders, brake pistons and parts for connection to the brake shoes.

In component groups of the afore-mentioned type, frequently, a plate section manufactured by punching and forming operations, such as deep-drawing, is used as the assembly base for the non-rotating components of a drum brake, with the plate section being so shaped that, in addition, it can assume the function of a mud plate. In a plate section of the afore-described type, a special stop is to be provided for supporting the brake shoes in the circumferential direction because the plate section as such for lack of an adequate thickness is not suitable for use as a stop. For this purpose, a dome-shaped bulge is formed in the plate section to which can be riveted a stop section. Not only does this involve relatively high operating efforts; it also requires a relatively great wall thickness of the plate section because substantial forces will have to be taken up and transmitted to the axle means on the vehicle side. Conversely, the assembly base made of sheet metal includes areas which in view of the uniform thickness of the starting material are substantially over-dimensioned and do not permit a weight reduction. An assembly base made of sheet metal for mounting the components of a drum brake on the vehicle side, it is true, can assume additional functions (stop, mud plate); however, with a view to adapting it to local load requirements and realizing a potential weight reduction substantial disadvantages are involved.

It is therefore the object of the invention to overcome, in a component group of the afore-described type, the defects especially involved with the assembly base for the non-rotating components, and to provide a component group which is generally easier and less costly to manufacture.

SUMMARY OF THE INVENTION

This problem, in the practice of the invention, is solved in that the assembly base, by die-casting or forging, is formed as a carrier plate having an integrally molded stop for circumferentially supporting the brake shoes, and that a separate, thin-walled mud plate is provided.

It has been found that adaptation of carrier plates of the afore-described type to load requirements locally greatly varying is substantially easier than adapting molds of sheet metal, and that, in the majority of cases, it is more advisable to provide a separate thin-walled component as the mud plate. An assembly base made of sheet metal, for safely transmitting the brake forces, must be of a solid plate-shaped configuration, while the assembly base of the invention—starting from a hub area—will only require individual radially extending webs so that while using the same material (steel) the total weight is reduced even though the wall areas, locally, are substantially thicker. It is true, when employing a light metal alloy for the carrier plate, the total material volume is increased; however, the total weight can also be kept lower than in a conventional assembly base consisting of a plate section.

Advantageous embodiments of the conception of the invention and additional details will be described in closer detail with reference to the embodiments.

BRIEF DESCRIPTION OF THE DRAWINGS

In the drawings,

FIG. 3 is a sectional view of a third embodiment;

FIG. 4 is a semi-sectional view of a fourth embodiment;

FIG. 5 is a sectional view of a fifth embodiment;

FIG. 6 is a sectional view of a detail of the mud plate fixation; and

DETAILED DESCRIPTION OF THE DRAWINGS

Figure 1:
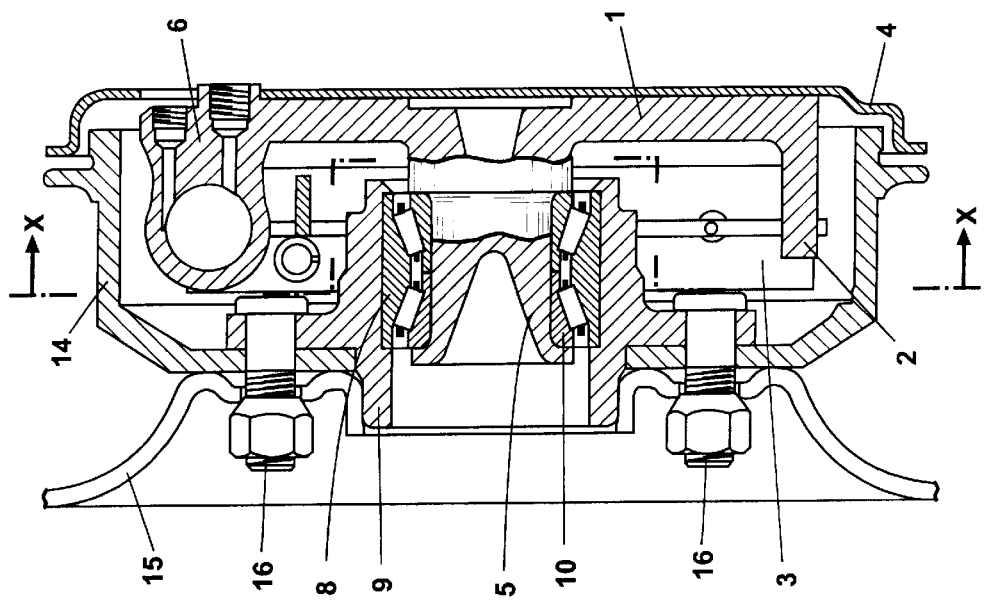
FIG. 1 is a sectional view of a first embodiment of the component group of the invention.

In the embodiment as shown in FIG. 1, the carrier plate 1 is formed integrally with a stop 2, an axle journal 5 and a brake cylinder. It is a matter of self-evidence that in this embodiment substantial weight savings can be achieved because the means of connection required for interconnecting the components in conventional unit groups are eliminated. In addition, component groups consisting of several units, as a rule, are anyway of a higher weight because the fixing areas generally require more material than is required with integral components.

It is of a substantial significance that chip forming processes for manufacturing mating faces for joining component groups of several parts can be eliminated so that manufacture of the assembly base of the invention compared to conventional embodiments is at substantially reduced costs.

The separately designed mud plate 4 can be in the form of a very thin sheet metal component because no forces are to be transmitted by it and, during assembly, it can be simply clamped between the carrier plate and the axle arrangement on the vehicle side. A brake drum 14 is secured in the usual way to the wheel hub 9. The outer ring 8 of an anti-friction bearing is forced into the wheel hub 9; by folding the inner edge of the wheel hub 9 it is axially clamped by roll-riveting. The inner ring 10 of the anti-friction bearing is similarly secured to the axle journal 5.

Figure 2:
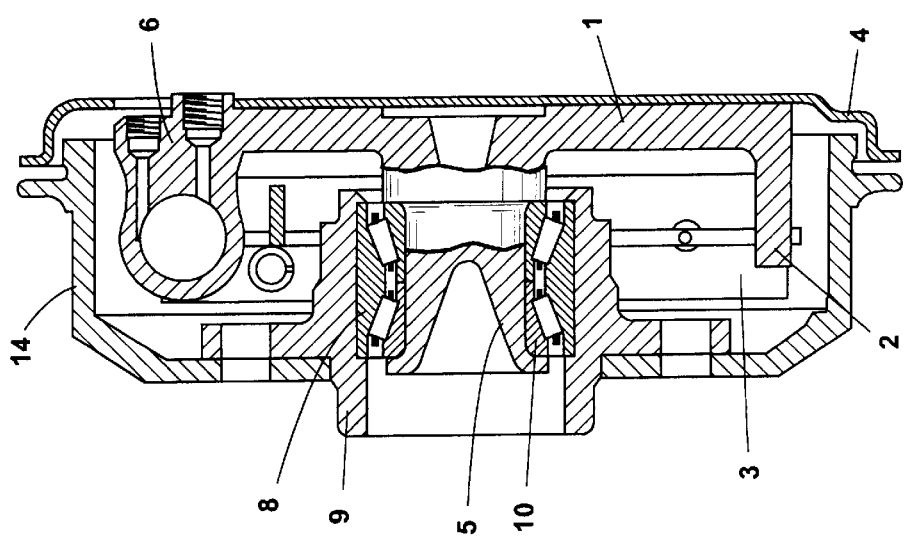
FIG. 2 is a sectional view of a second embodiment of the component group of the invention.
Figure 7:
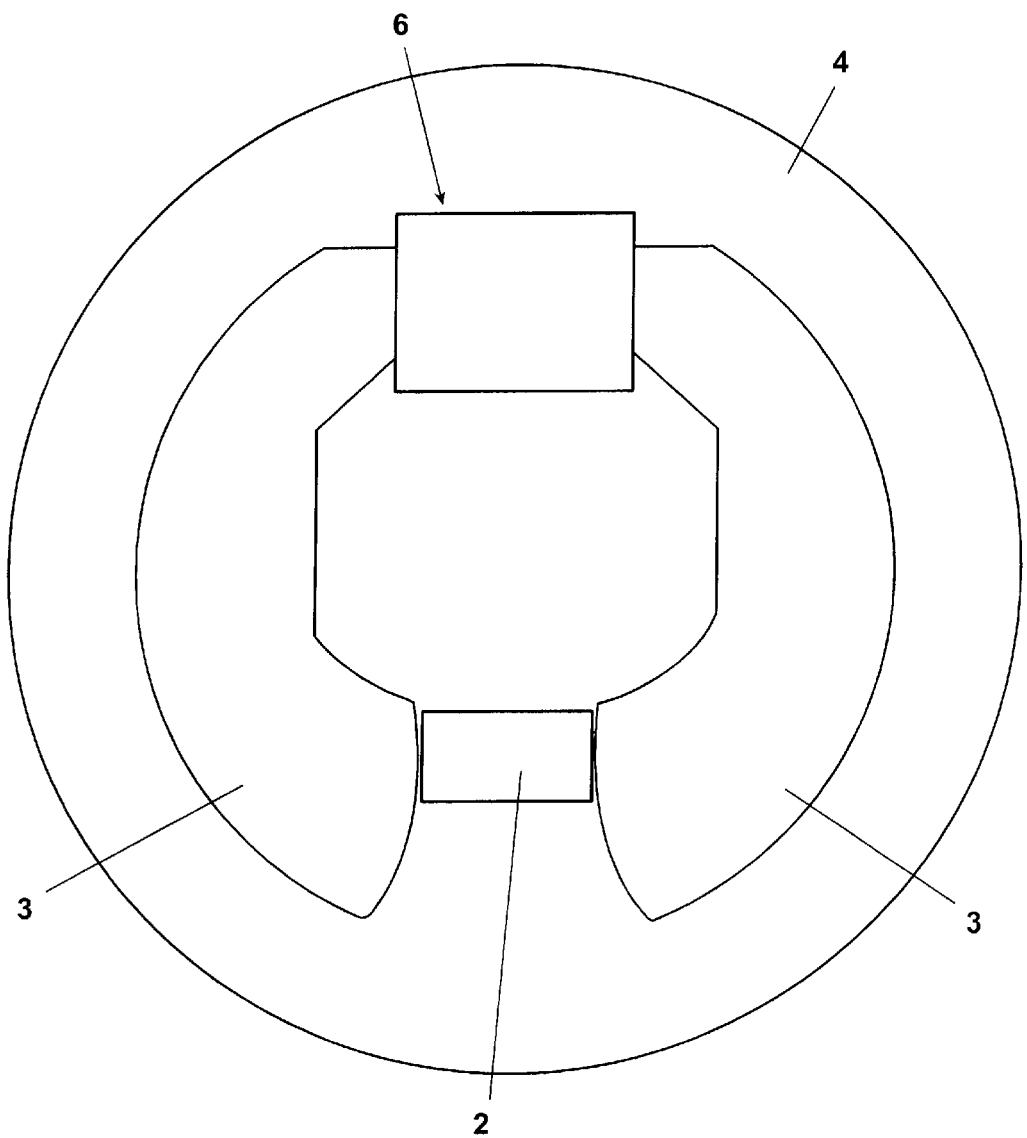
FIG. 7 is a sketch illustrating front view of the main components of the integral block according to the present invention that are shown in FIG. 1.

The embodiment according to FIG. 2 differs from the one of FIG. 1 only in that a separate brake cylinder 6 is provided and that, in addition, a part of the wheel rim 15 and the connection thereof to the wheel hub by threaded bolts 16 is shown. Incidentally, the carrier plate 1 with the integrally molded stop 2 for the support of the brake shoes 3 in the circumferential direction, and with the integrally molded wheel journal 5, is of the same design as in the example of embodiment according to FIG. 1. Also the mud plate 4 is left unchanged.

The embodiments according to FIGS. 1 and 2 are especially suitable for using steel as the manufacturing material; under manufacturing aspects it could be advantageous to produce a separate brake cylinder, which would permit a more flexible adaptation to varying brake systems. Moreover, the brake cylinder—according to common practice—can be made of a light metal alloy, with the profile as shown enabling a low cost manufacture by extrusion.

Compared therewith, the embodiments according to FIGS. 3 to 5 are more suitable for a combination of an axle journal 5' of steel and a carrier plate 1 of a light metal alloy. The stop 2 and the brake cylinder 6, preferably, can be integrally molded, while the axle journal 5' is furnished with a flange 7 internally or externally inserted into a corresponding recess of the carrier plate 1 and connected to the carrier plate 1 by the same connecting means fixing the unit to the axle assembly on the vehicle side. The separately produced thin mud plate 4, in the embodiments of FIGS. 3 and 4 is simply clamped along therewith.

According to FIG. 5, the carrier plate 1 is designed in light-weight construction and is of a fin-type or honeycomb configuration manufactured by die-casting or forging; it includes an integrally molded mud ring 12. Hence, the so manufactured carrier plate 1, in terms of rigidity, can be optimally adapted to locally varying load requirements, with maximum weight savings being achievable in this way.

Concerning the embodiments according to FIGS. 3 and 4, rivet journals 13 can, if so required, be integrally provided on the carrier plate 1 for securing the separate mud plate 4.

The embodiments show that local requirements are met substantially better by a carrier plate manufactured by die-casting or forging than by a plate section; in this way there is additional potential for weight reductions and decreased processing costs.

What is claimed is:

1. An integral block for non-driven and non-steerable wheels of a vehicle, comprising a brake drum, a wheel hub, an anti-friction bearing, an axle journal, a separate thin-walled mud plate, and an assembly base for non-rotating components of a drum brake inclusive of brake shoes, brake cylinders, brake pistons and parts for connecting the brake shoes, the assembly base being formed as a carrier plate having an integrally formed stop for circumferentially supporting the brake shoes, wherein the separate mud plate is secured by rivet journals integrally molded to the carrier plate, the carrier plate being integrally formed with the axle journal.

2. The integral block according to claim 1, wherein the carrier plate, during assembly of the unit, is connected to the vehicle axle, with the mud plate being clamped between the carrier plate and a front-sided stop face.

3. The integral block according to claim 2, wherein the carrier plate is formed with an integrally molded brake cylinder.

4. The integral block according to claim 1, wherein the carrier plate is made of steel.

5. An integral blot for non-driven and non-steerable wheels of a vehicle, comprising a brake drum, a wheel hub, an anti-friction bearing, an axle journal, and an assembly base for non-rotating components of a drum brake inclusive of brake shoes, brake cylinders, brake pistons and pas for connecting the brake shoes, the assembly base being formed as a carrier plate having an integrally formed stop for circumferentially supporting the brake shoes, with an outer ring of the anti-friction bearing being axially fixed in the wheel hub by roll-riveting and an inner ring of the anti-friction bearing being pushed onto the ale journal and axially fixed by roll-riveting.

6. An integral block for non-driven and non-steerable wheels of a vehicle, comprising a brake drum, a wheel hub, an anti-friction bearing, an axle journal, and an assembly base for non-rotating components of a drum brake inclusive of brake shoes, brake cylinders, brake pistons and parts for connecting the brake shoes, the assembly base being formed as a carrier plate made of light metal alloy having an integrally formed stop for circumferentially supporting the brake shoes, the carrier plate being integrally formed with the axle journal.

7. The integral block according to claim 6, wherein the carrier plate is formed with an integrally molded brake cylinder.

8. An integral block according to claim 6, further comprising a mud ring integrally molded with the carrier plate, and wherein the carrier plate, in light-weight construction, is of a fin type.

9. An integral block according to claim 6, further comprising a mud ring integrally molded with the carrier plate, and wherein the carrier plate, in light-weight construction, is of a honeycomb structure.

* * * * *

UNITED STATES PATENT AND TRADEMARK OFFICE
CERTIFICATE OF CORRECTION

PATENT NO.    : 6,216,832 B1
DATED         : April 17, 2001
INVENTOR(S)   : Andreas Doell; Michael Schorn; Michael Kautenburger; Marc-Oliver Rettig It is certified that error appears in the above-identified patent and that said Letters Patent is hereby corrected as shown below:

<u>Column 4,</u>
Line 12, change "pistons and pas" to -- pistons and parts --.

Signed and Sealed this

Twenty-sixth Day of March, 2002

*Attest:*

JAMES E. ROGAN
*Attesting Officer*   *Director of the United States Patent and Trademark Office*